United States Patent
Tanaka et al.

[11] Patent Number: 6,015,021
[45] Date of Patent: *Jan. 18, 2000

[54] ELECTRICALLY ASSISTED VEHICLE

[75] Inventors: Tatsuaki Tanaka, Kasai; Toshihiro Suhara, Taka-gun; Toshihiro Matsumoto, Kasai; Hiroaki Sagara, Kasai; Yoshihiko Maeda, Kasai, all of Japan

[73] Assignee: Sanyo Electric Co., Ltd., Japan

[ * ] Notice: This patent is subject to a terminal disclaimer.

[21] Appl. No.: 08/918,592

[22] Filed: Aug. 19, 1997

[30] Foreign Application Priority Data

Aug. 28, 1996 [JP] Japan ................................. 8-226762

[51] Int. Cl.$^7$ ................................................. B62K 11/00
[52] U.S. Cl. ............................................ 180/206; 180/220
[58] Field of Search ...................... 180/65.2, 65.6, 180/205, 206, 207, 218, 219, 230, 11, 220

[56] References Cited

U.S. PATENT DOCUMENTS

| | | | |
|---|---|---|---|
| 5,024,286 | 6/1991 | Lean et al. | 180/206 |
| 5,226,501 | 7/1993 | Takata | 180/206 |
| 5,234,066 | 8/1993 | Ahsing et al. | 180/6.5 |
| 5,341,892 | 8/1994 | Hirose et al. | 180/220 |
| 5,664,636 | 9/1997 | Ikuma et al. | 180/206 |
| 5,798,702 | 8/1998 | Okamoto et al. | 340/636 |
| 5,818,189 | 10/1998 | Uchiyama et al. | 318/488 |
| 5,860,487 | 1/1999 | Tanaka et al. | 180/206 |

FOREIGN PATENT DOCUMENTS

| | | |
|---|---|---|
| 0590674 | 4/1994 | European Pat. Off. . |
| 0650887 | 5/1995 | European Pat. Off. . |
| 0756856 | 7/1995 | European Pat. Off. . |
| 0675037 | 10/1995 | European Pat. Off. . |

*Primary Examiner*—Robert J. Oberleitner
*Assistant Examiner*—Daniel Yeagley
*Attorney, Agent, or Firm*—Morrison Law Firm

[57] ABSTRACT

An electrically assisted vehicle includes a vehicle body having a driving wheel driven by human driving power and electric driving power, a driving power applying section for applying the human driving power to drive the driving wheel, a torque detection section to detect the human driving power applied to the driving power applying section, a motor to auxiliarily drive the driving wheel by the electric driving power, a battery to supply power for the motor, and a control section to control the motor according to a result detected by the torque detection section, wherein the control section has a plurality of switchable assist modes relating to an assist ratio of the electric driving power to the human driving power.

14 Claims, 14 Drawing Sheets

ELECTRICALLY ASSISTED VEHICLE

BACKGROUND OF THE INVENTION

1. Field of the Invention

The present invention relates to an electrically assisted vehicle such as an electrically assisted bicycle and wheelchair which has a driving power applying section for applying human driving power to drive a driving wheel as well as an electric driving section for driving an electric motor to auxiliarily drive the driving wheel in correspondence with the human driving power applied to the driving power applying section.

2. Description of Related Art

Generally known electrically assisted vehicles of this kind include electrically assisted bicycles. In an electrically assisted bicycle, the human driving power applied on pedals is supplemented with electric driving power by an electric motor constantly at an assist ratio of 1:1. The assist ratio is a ratio of the electric driving power to the human driving power. Thus, the electrically assisted bicycle needs only half of the human driving power that is required for driving a bicycle which is driven only by human power.

In the conventional electrically assisted bicycles, only one mode is provided for controlling the assist ratio. For example, the assist ratio is predetermined as shown in FIG. 6 and the electric driving power is outputted according to this predetermined assist ratio. In this figure, a torque of the human power is plotted in abscissa and the assist ratio of the electric driving power is plotted in ordinate. This figure shows at what assist ratio the electric driving power is outputted when a certain value is inputted as the human power torque. When the human power torque is small, for example, when the bicycle is traveling on level ground, the assist ratio is set to be small because much assistance by the electric driving power is not required. The assist ratio increases gradually as the human power torque increases. When the human power torque is large, for example, when the bicycle is being started or is traveling up a slope, much assistance by the electric driving power is required. Accordingly, when the human power torque exceeds a predetermined value, the output of the motor is set to equal the human power torque.

In this case, the consumption of a battery is saved for long battery life by setting a small assist ratio for a small human power torque.

Though the above-described control is suitable for saving the consumption of the battery, a problem occurs in working pedals, for example, when traveling up a slope or starting the bicycle.

FIG. 14 illustrates the problem. In FIG. 14, the torque is plotted in ordinate and time is plotted in abscissa. A curving solid line represents changes in the power applied to the pedals, that is, changes in the human power torque. A curving dotted line represents changes in the output torque by the motor. A straight solid line represents an average human power torque, and a straight dotted line represents an average torque outputted by the motor. This figure shows that, since the assist ratio of the output by the motor to the human power torque is set as shown in FIG. 6, the torque outputted by the motor is small when the human power torque is small, and that there is a difference between the average human torque and motor torque. In other words, a user sometimes feels that he/she does not obtain enough torque where the assist ratio is small, for example, while traveling up a slope.

SUMMARY OF THE INVENTION

In view of the above-described problems, an object of the present invention is to provide an electrically assisted vehicle which can save the consumption of a battery for long battery life and can also provide enough assistance where assistance by electric driving power is required.

The present invention provides an electrically assisted vehicle including a vehicle body having a driving wheel driven by human driving power and electric driving power, a driving power applying section for applying the human driving power to drive the driving wheel, a torque detection section to detect the human driving power applied to the driving power applying section, a motor to auxiliarily drive the driving wheel by the electric driving power, a battery to supply power for the motor, and a control section to control the motor according to a result detected by the torque detection section, wherein the control section has a plurality of switchable assist modes relating to an assist ratio of the electric driving power to the human driving power.

With this construction, the motor can be controlled in a suitable assist mode according to the detection result obtained by the torque detection section. Thus, an excessive consumption of the battery can be prevented for long battery life, and also sufficient assistance can be obtained without lack of torque when a large amount of assistance is required.

In this specification and the claims following the specification, the "torque" means the magnitude or strength of rotation driving power.

BRIEF DESCRIPTION OF THE DRAWINGS

For a further understanding of the present invention, reference should be made to the following detailed description taken in conjunction with the accompanying drawings, in which.

DESCRIPTION OF THE PREFERRED EMBODIMENTS

Figure 1:
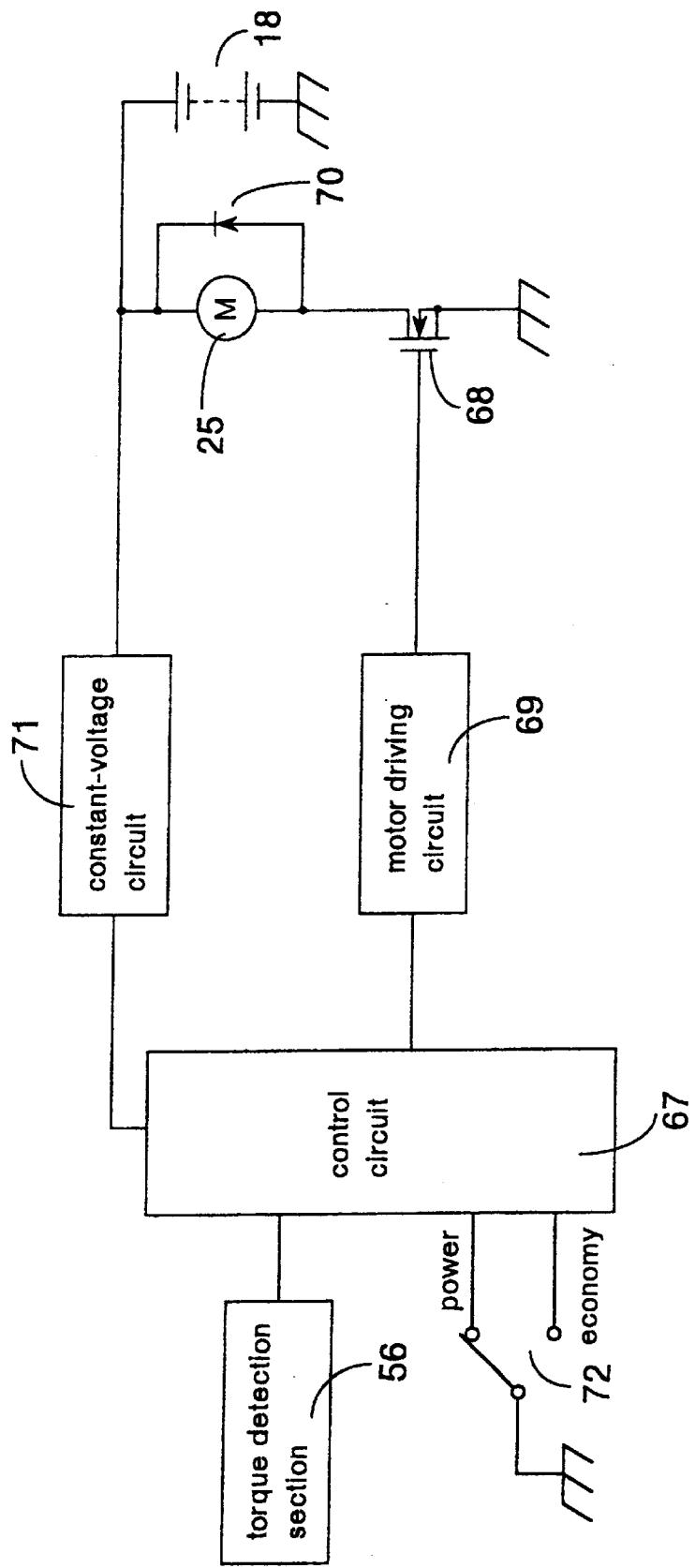
FIG. 1 is a block diagram illustrating a control circuit in accordance with Embodiment 1 of the present invention.

The electrically assisted vehicle of the present invention is driven by human driving power and electric driving power. Examples of the human driving power includes pedaling power by a user in the case where the vehicle body is a bicycle and the driving power applying section is pedals mounted on the bicycle body, and power applied by a user for rotating a push rim in the case where the vehicle body is a wheelchair body and the driving power applying section is a push rim mounted on the wheelchair body.

The torque detection section which is mounted on a part of the vehicle body regularly detects the presence of such human driving power and, if it is present, the magnitude of the human driving power. The driving power by the motor is used as the electric driving power. This motor is supplied with power by the battery mounted on the vehicle body as a power source, and auxiliarily drives the driving power.

The control section is electrically connected to the torque detection section and controls the motor according to the detection result obtained by the torque detection section. The control section has plural switchable assist modes and selects a suitable one from these assist modes for controlling the motor. The assist modes are created and stored in the control section beforehand in view of plural modes which may be required for suitably controlling the motor by means of the assist ratio of the electric driving power to the human driving power.

The plural assist modes stored in the control section may include an economy mode and a power mode, for example. In the economy mode, the assist ratio is gradually raised with increase of the human power torque until the human power torque reaches a predetermined value, and then, when the human power torque exceeds the predetermined value, the assist ratio is maintained at a constant value. In the power mode, the assist ratio is maintained at a constant value regardless of the value of the human power torque.

In the electrically assisted vehicle of the present invention, the torque detection section may preferably detect the presence of the human driving power or determine the magnitude of the human driving power.

With the former construction, when the torque detection section detects the presence of the human driving power, i.e., when the torque detection section detects that the human power torque such as pedaling power or rotating power by hands is applied to the driving power applying section such as the pedals of a bicycle or the push rims of a wheelchair,—the motor can be controlled in one desired assist mode (for example, in the power mode). When the torque detection section does not detect the human driving power, i.e, when the torque detection section does not detect that the human power torque such as the pedaling power or push rim rotating power is applied while the driving wheel is rotating,—the motor can be controlled in another desired assist mode (for example, in a mode to reduce the assist ratio to 0).

With the latter construction, on the other hand, the motor can be controlled in the power mode or the economy mode according to the magnitude of the human driving power detected by the torque detection section.

One example of the torque detection section having the latter construction converts a compression amount of a helical spring in a direction of rotation of the driving wheel into an amount of movement in a direction of an axle of the driving wheel and detects the amount of movement as an electric signal by an induction coil. This example will be further discussed as an embodiment.

Preferably the electrically assisted vehicle of the present invention may further include a switch for selecting one of the plural assist modes. A user may operate the switch to select a desired assist mode. Such a switch is mounted on, for example, the handlebar portion or the battery mounting portion of a bicycle body. The user can operate the switch before starting and while riding the bicycle in order to select any assist mode.

Preferably the electrically assisted vehicle of the present invention may further include a traveled-distance calculating section for calculating a continuous distance traveled from a stop (a continuous distance traveled from where the vehicle stops to where it is running) until it stops next. The control section may be constructed to instruct the switching of one assist mode to another when the traveled distance calculated by the traveled-distance calculating section reaches a predetermined value.

The traveled-distance calculating section calculates the traveled distance from a certain stop for the following reason: The human driving power applied to the driving power applying section must be large at starting, that is, when the vehicle changes from a stopping state to a running state. Then, once the vehicle has come into the running state, the human driving power may be relatively small until the vehicle stops next. Accordingly, until the traveled distance from the stop reaches the predetermined value, the motor is controlled to provide a relatively large amount of assistance to the driving wheel. Then, after the traveled distance has reached the predetermined value, the motor is controlled to provide a relatively small amount of assistance to the driving wheel.

Preferably, the electrically assisted vehicle of the present invention may further include a human power torque calculating section for calculating an average magnitude of the human driving power. The control section may be constructed to instruct which one of the plural assist modes to select, according to the average magnitude of the human driving power calculated by the human power torque calculating section. The average magnitude of the human driving power may be an average magnitude of the human driving power applied to the driving power applying section within a predetermined time period or an average magnitude of the human driving power applied to the driving power applying section a predetermined number of times, for example.

EMBODIMENT

Embodiment 1 of the present invention is now described in detail with reference to FIGS. 1 to 11.

Figure 5:
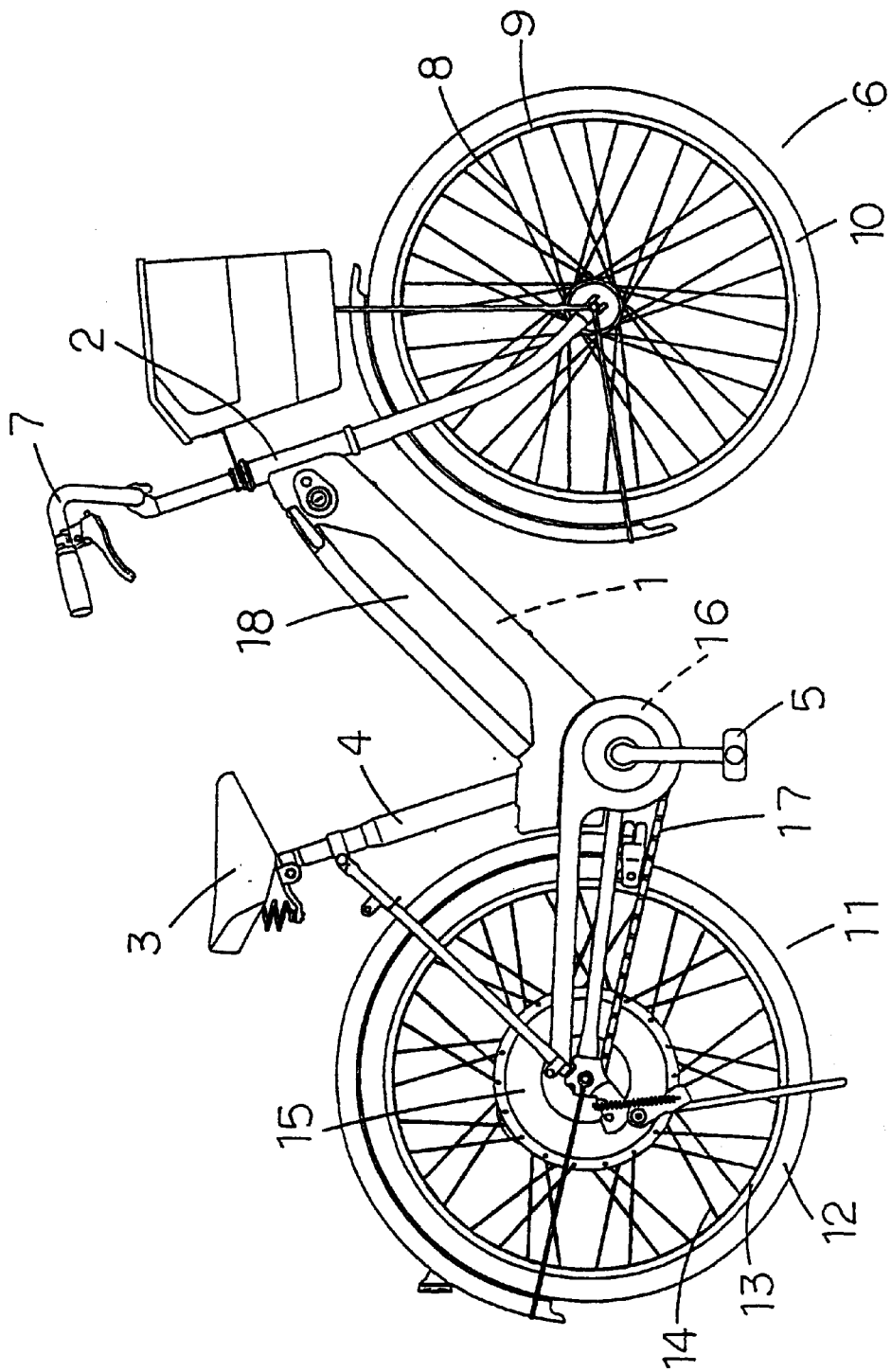
FIG. 5 illustrates a general construction of a vehicle in accordance with Embodiment 1 of the present invention.

First, the overall construction of an electric bicycle is explained according to FIG. 5.

The reference numeral 1 denotes a main frame connected with a head pipe 2 disposed at the front and a seat pipe 4 disposed below a saddle 3. Pedals 5 rotatable by human power are mounted as a human power applying section on the main frame 1 at a portion where the main frame 1 is connected with the seat pipe 4.

The reference numeral 6 denotes a front wheel which determines a traveling direction in link with handlebars 7 through operation of the handlebars 7. The front wheel 6 is composed of spokes 8, a rim 9 and a tire 10.

The reference numeral 11 denotes a rear wheel which is a driving wheel. The rear wheel 11 is also composed of a tire 12, a rim 13, spokes 14 and a driving section 15 for driving the rear wheel 11.

The reference numeral 16 denotes a front sprocket which rotates with rotation of the pedals 5. A chain 17 is set on the front sprocket 16 and transmits the rotation of the front sprocket 16 to a rear sprocket 50 mounted on a axle of the driving section 15 as a motive power.

The reference numeral 18 denotes a battery for supplying electric power to a motor 25 which will be described later, which houses a 24-volt nickel cadmium battery. The battery 18 is removable and can be recharged indoors.

Figure 2:
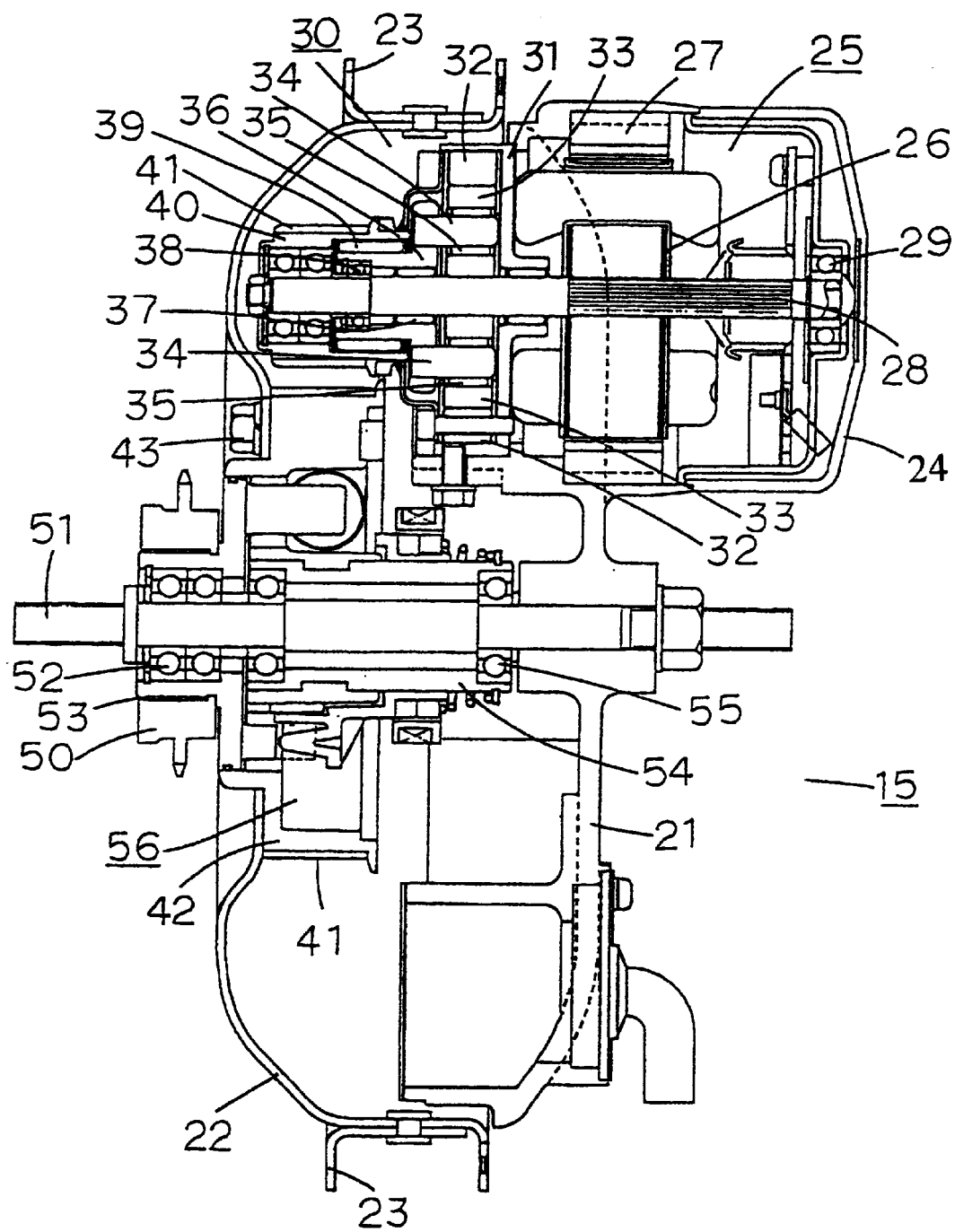
FIG. 2 is a sectional side elevation illustrating a driving section in accordance with Embodiment 1 of the present invention.
Figure 3:
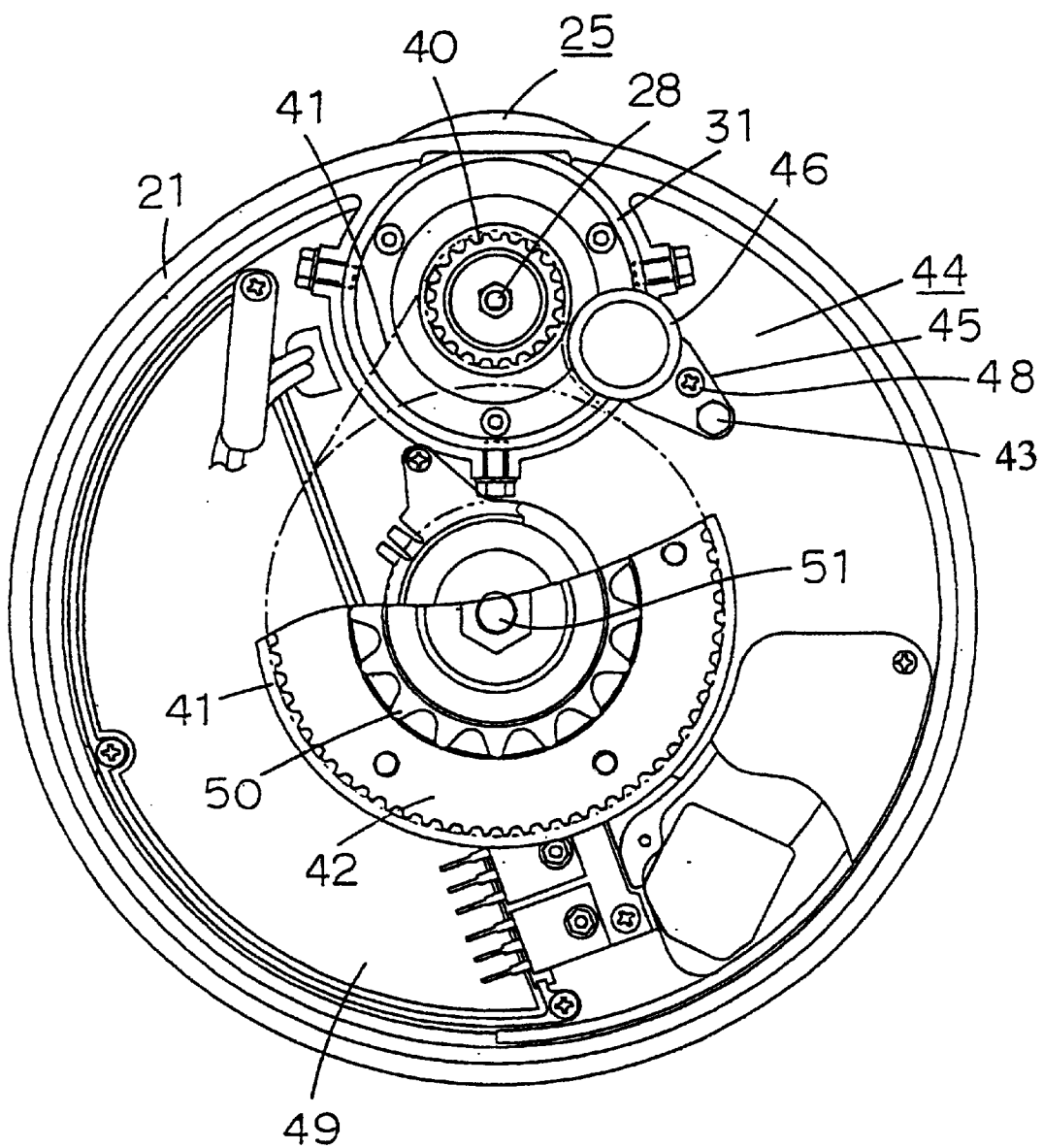
FIG. 3 is a plan view illustrating a construction of the driving section in accordance with Embodiment 1 of the present invention.

FIGS. 2 and 3 show an exemplary construction of the driving section 15.

The reference numeral 21 denotes a fixed, disk-like casing fixed to the main frame 1, and 22 denotes a rotary casing which is coaxial with the fixed casing 21 and rotates on the outer side of the fixed casing 21. The fixed casing 21 and the rotary casing 22 constitute a hub together. The fixed casing 21 is formed of a light alloy of 2 mm thickness.

The reference numeral 23 denotes an L-shaped annular rib mounted on the outer periphery of the rotary casing 22. The annular rib 23 is fixed to the rotary casing 22 at plural positions. The spokes 14 are disposed extending in tension from the annular rib 23 to the rim 13 on which the tire 12 is fitted. The annular rib 23 is formed of a steel sheet to have a thickness of 2.3 mm. The annular rib 23 is formed as a different component from the rotary casing 22. Because the annular rib 23 is subjected power from the spokes 14 and therefore need resistance thereto, the annular rib 23 is formed thick of a strong material, while the rotary casing 22 which receives weaker power is formed thinner of a weaker material than the annular rib 23. Thus, the annular rib 23 and the rotary casing 22 are formed of different materials and in different thickness. With such construction, the overall weight of the driving section 15 can be reduced, and production costs can also be reduced by suitably choosing materials.

The reference numeral 25 denotes a motor for supplying driving power, 26 denotes a rotor, and 27 denotes a stator. The motor 25 is mounted on the fixed casing 21. A part of the motor 25 which extends to the outside of the rotary casing 22 is covered with a motor cover 24. An output shaft 28 of the motor 25 is supported by a bearing 29.

The reference numeral 30 denotes a planetary roller speed-reduction mechanism which is fitted to the fixed casing 21 by a screw and is engaged with a support 31. The planetary roller speed-reduction mechanism 30 is arranged co-axially with the output shaft 28.

Next, explanation is given to the construction of the planetary roller speed-reduction mechanism 30.

The reference numeral 32 denotes a fixed wheel fixed to the support 31 by a screw. Four planetary rollers 33 are provided inside the fixed wheel. The planetary rollers 33 are so disposed that their outer periphery contacts the inner surface of the fixed wheel outside and contacts the output shaft 28 of the motor 25 inside. Output pins 34 are provided at the centers of the planetary rollers 33, and needle bearings 35 are provided between the output pins 34 and the planetary rollers 33.

In the planetary roller speed-reduction mechanism 30, when the output shaft 28 of the motor 25 rotates, the planetary rollers 33 contacting the output shaft 28 rotate on their own axes, i.e., the output pins 34, and also revolve about the output shaft 28 since they contact the fixed wheel 32. By thus taking rotary output from the output pin 34, the output of the motor 25 can be reduced and utilized.

The reference numeral 36 denotes a cylindrical support member supported at its axis by the output pin 34 at the bottom and passing through the output shaft 28. A bearing 37 is provided between the support member 36 and the output shaft 28, and another bearing 38 is provided between an end portion of the support member 36 and the output shaft 28.

The reference numeral 39 denotes a one-way clutch mounted on the outer periphery of the support member 36.

The one-way clutch serves to prevent the power from the pedals 5 from being transmitted to the motor and to transmit the driving power of the motor 25 to the rotary casing 22.

The reference numeral 40 denotes a first pulley co-axially mounted on the output shaft 28 through two bearings and the one-way clutch 39. A rubber belt 41 is fitted on the first pulley 40.

The reference numeral 42 denotes a second pulley on which the other end of the rubber belt 41 is fitted. The second pulley 42 is fixed to the rotary casing 22 by a bolt 43. The second pulley has a hollow to accommodate a torque sensor 56 which will be described later.

The reference numeral 44 denotes a tension pulley for adjusting the tension of the belt 41. The tension pulley 44 includes a support 45 provided with a roller 46 at one end and a screw 47 for securing the tension pulley 44 to the fixed casing 21 at the other end. The support 45 is oscillatable about a point where the screw is fitted. By tightening another screw 48, the belt 41 is pressed and thus the tension of the belt 41 can be adjusted.

The reference numeral 49 is a control circuit board housed in the fixed casing 21. The control circuit board 49 is accommodated in a portion where the pulleys are not housed. On the control circuit board 49, mounted are a microcomputer for controlling the rotation of the motor 25 according to the results outputted by a torque detection section 56 which will be discussed later, a driving circuit 69 for PWM(Pulse Width Modulation)-controlling the motor 25, a constant-voltage circuit for supplying a start-up voltage to the microcomputer, a torque detection circuit and the like.

The rear sprocket 50 around which the chain 17 is fitted is mounted on the axle 51 through a bearing 52 and fitted to a later-described turning plate 57 through the one-way clutch 53.

The reference numeral 54 is a turning cylinder mounted on the axle 51 through a bearing 55. The turning cylinder 54 turns in a normal direction and a reverse direction within a predetermined angle with the rotation of the rotary casing 22.

The torque detection section 56 is fitted in proximity to the second pulley 42 and the axle 51. The torque detection section 56 is provided to detect human driving power transmitted by the chain 17, namely human power torque.

Figure 4:
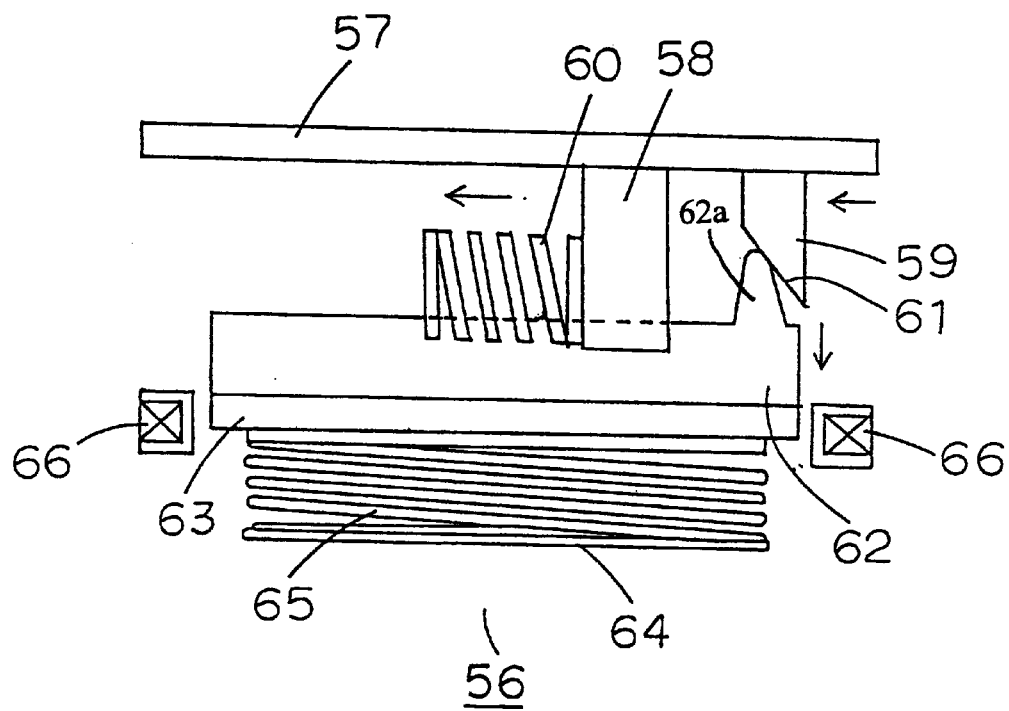
FIG. 4 is a schematic view illustrating an operation of a torque detection section in accordance with Embodiment 1 of the present invention.

The torque sensor 56 is now described with reference to FIG. 4. First, each constituent is explained.

The turning plate 57 is concentric with the axle 51. The turning plate 57 has, at opposing sites, integrated pushing rods 58 and integrated converting rods 59 which extend in the axial direction. The pushing rods 58 face each other and so the converting rods 59. The pushing rod 58 is formed in the shape of a prism having a bell-shaped surface. The pushing rod 58 pushes an elastic member, namely a spring 60, at one end of the elastic member with the curved surface of the bell shape. Thus, the turning plate 57 compresses the spring 60, and the other end of the spring 60 pushes an inner wall of the second pulley 42 while the second pulley 42 turns. The converting rod 59 is a rectangular parallelepiped extending in the direction of the axle 51. An end portion thereof has a sloping face so that the converting rod gradually reduces its length in the direction of rotation.

The spring 60 pushed by the pushing rod 58 makes contact with a part of the rotary casing 22 at the other end. The human driving power is transmitted from the turning plate 57 to the pushing rod 58, and then compresses the spring 60 to turn the rotary casing 22. In correspondence with the amount of compression of the spring 60, the turning plate 57 turns while causing a small delay to the rotary casing 22. Thus, the turning plate 57 turns normally and reversely within a predetermined angular width in correspondence with the magnitude of the human driving power. At this time, the converting rod 59 also turns as a result of slight turn of the turning plate 57. The sloping end 61 formed at the end of the converting rod 59 pushes and moves a mountain-shaped portion 62a of an annular siding member 62 in contact with the sloping end 61 in the direction of the axle 51. An aluminum ring 63 is attached on the annular sliding member 62. This ring 63 moves as the annular sliding member 62 moves. The ring 63 and the annular sliding member 62 are urged toward the turning plate 57 by a spring 65 mounted to the ring 63. The spring 65 is provided with a C-ring 64 at the end opposite to the ring 63. The ring 63 moves in the direction of the axle 51 by an amount corresponding to the amount of the turning of the rotary casing 22 and the turning plate 57.

The reference numeral 66 denotes coils mounted on the fixed casing 21 in the proximity to the outer periphery of the ring 63. The coils 66 convert changes in inductance caused by approach of the ring 63 into an electric signal. The human power torque can be detected using an output of the electric signal. The members shown in FIG. 4 are together referred to as a torque sensor 56. Members which serve to convert a movement in the direction of rotation into a movement in the direction of the axle, including the converting rod 59 and the mountain-shaped portion 62a, are together called a conversion member.

Next, with the above-mentioned construction, the transmission of power is described.

To begin with explanation of a human driving power system, the human power provided by the pedals 5 is transmitted to the rear sprocket 50 by the chain 17 and then, through the turning plate 57 and the spring 60, rotates the rear wheel 11. Next, about an electric driving power system, the amount of compression of the spring 60, i.e., the amount of rotary travel of the turning plate 57, is converted into a movement in the direction of the axle 51 by the conversion member, and the ring 63 moves by this axial movement. This movement of the ring 63 is converted into a change in inductance of the coil 66 and inputted as an electric signal to the control circuit board 49 which is accommodated in the fixed casing 21. The control circuit board 49 receives the signal from the coil 66 and outputs a driving signal to rotate the motor 25 according to the received signal. The output of the motor 25 is reduced by the planetary roller speed-reduction mechanism 30 and rotates the rear wheel 11 through the first pulley 40.

The control section is now described with reference to FIG. 1.

The reference numeral 67 denotes a control circuit as a control section for PWM-controlling the motor 25 with a switching element 68 for driving. The control circuit 67 serves to drive the motor 25 by an output according to the torque detected by the torque sensor 56.

The switching element 68 switches the passage of electric current through the motor 25 to ON or OFF. The switching element 68 is controlled to switch to ON or OFF by a motor driving circuit 69 which provides output according to the signal from the control circuit 67.

The reference numeral 70 denotes a fly-wheel diode connected in parallel to the motor 25.

The reference numeral 71 denotes a constant-voltage circuit to reduce the voltage of the battery 18 to generate a voltage for actuating the control circuit 67.

Figure 6:
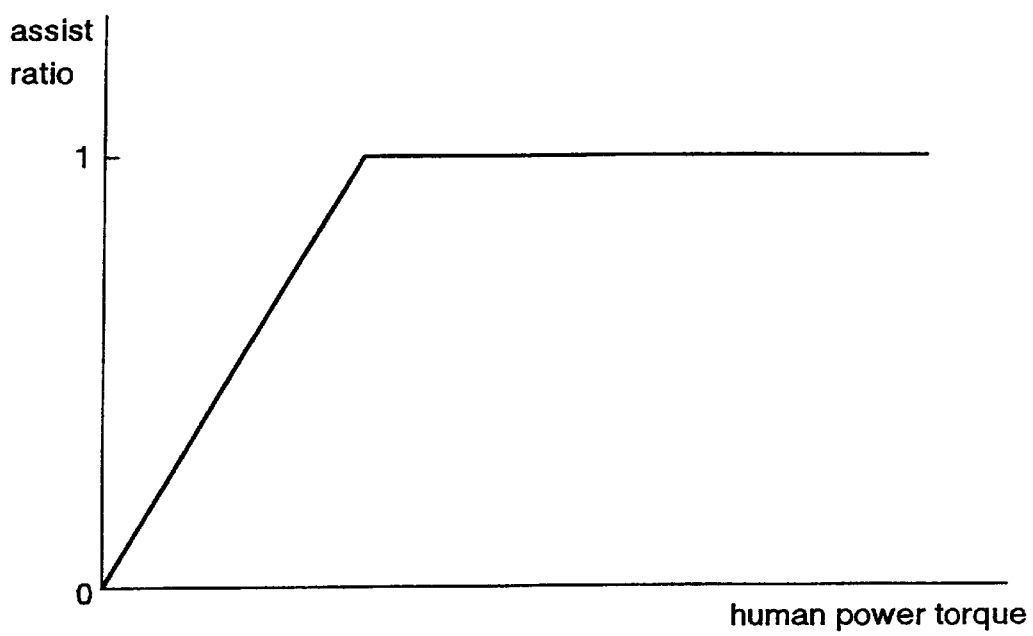
FIG. 6 is a graph representing an assist ratio in an economy mode in accordance with Embodiment 1 of the present invention.
Figure 7:
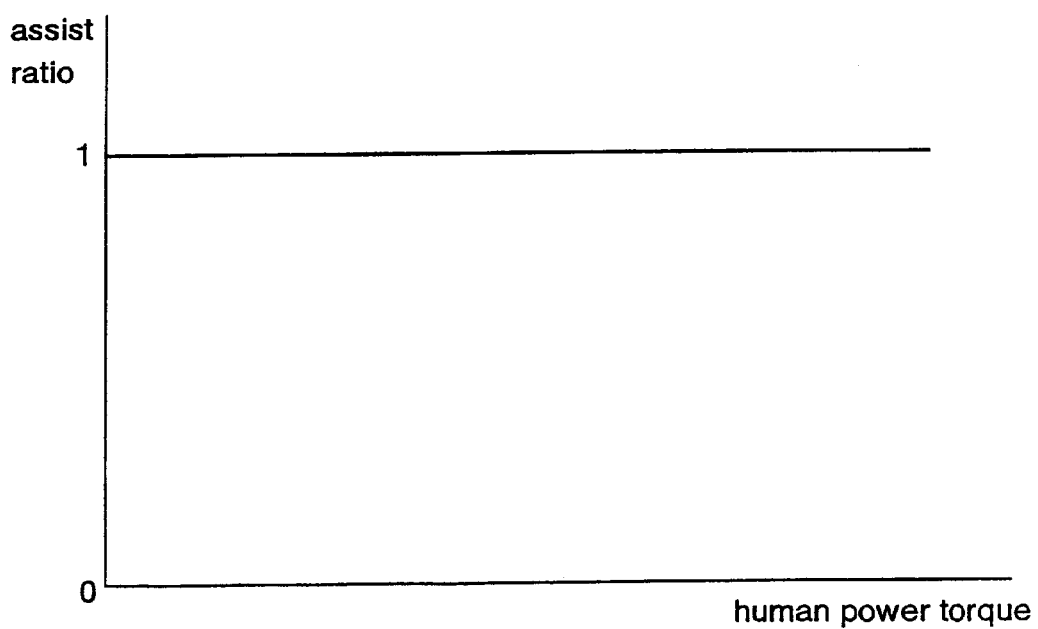
FIG. 7 is a graph representing an assist ratio in a power mode in accordance with Embodiment 1 of the present invention.

The reference numeral 72 denotes switching means, i.e., a switch, mounted on the bicycle body for switching two assist modes, a power mode and an economy mode. Graphs shown in FIGS. 6 and 7 represent settings for the ratio of the torque outputted by the motor of the electric driving section to the human power torque, that is, the assist ratio. When the switch 72 is switched to the economy mode, the electric driving power is outputted according to the graph shown in FIG. 6. When the switch 72 is switched to the power mode, the electric driving power is outputted according to the graph shown in FIG. 7. The settings shown in FIGS. 6 and 7 are established as table data in the control circuit 67 beforehand.

The economy mode shown in FIG. 6 is first explained. The human power torque is plotted in horizontal axis, and the assist ratio of the electric driving output to the human power torque is plotted in vertical axis. When the human power torque is small, the assist ratio of the electric driving power is set to be small. As the human power torque increases, the assist ratio of the electric driving power increases. When the human power torque reaches a predetermined value, the assist ratio is set to be constant. For example, when the human power torque is larger than the predetermined value, the assist ratio is set to 1 so that only the same magnitude of electric driving power as the human power torque is outputted.

In the power mode shown in FIG. 7, the assist ratio is always set to 1 whatever the human power torque may be. Compared with the economy mode, a larger electric driving power can be obtained even when the human power torque is small.

The operation of the control circuit 67 is now explained.

The assist ratio is determined in the control circuit 67 in accordance with the mode selected by a user by means of the switch 72 before operation.

When the pedals 5 receive pedaling power, a torque signal is inputted from the torque sensor 56 to the control circuit 67. Based on this signal, a driving signal is outputted to the motor driving circuit 69 to drive the motor 25 according to the mode set in the control circuit 67. The motor 25 is PWM-controlled by switching a switching element 68.

For example, suppose the economy mode is selected. When the human power torque is small, e.g., when traveling on level ground, the assist ratio is small because much assist power is not needed. When the human power torque is large, e.g., when starting or traveling on an upward slope, the assist ratio is large because much assist power is needed. With this setting of the assist ratio, the consumption of the battery 18 is saved, which contributes to long battery life.

In the power mode, on the other hand, the electric driving power is outputted by the motor always with the same torque. Therefore, even when the human power torque is small, a large assist power can be obtained.

This switching between the power mode and the economy mode through the switch 72 enables a user to enjoy comfortable traveling by adjusting the assist power depending on where to travel and what assist ratio to desire.

In Embodiment 1, the economy mode shown in FIG. 6 and the power mode shown in FIG. 7 are used for controlling the electric driving power. The assist modes, however, are not limited to those in embodiment 1. For example, a power mode in which the assist ratio is always 2.0 regardless of the magnitude of the human power torque and the power mode in which the assist ratio is always 1.0 as shown in FIG. 7 may be used to control the electric driving power. Alternatively, the assist modes may be a combination of three or more modes in which the assist ratio is always 0.5, 1.0, 2.0, 3.0, 4.0 or the like, for example.

Embodiment 2 is now described.

The construction of a bicycle of this embodiment is the same as Embodiment 1. So the description thereof is omitted.

Figure 8:
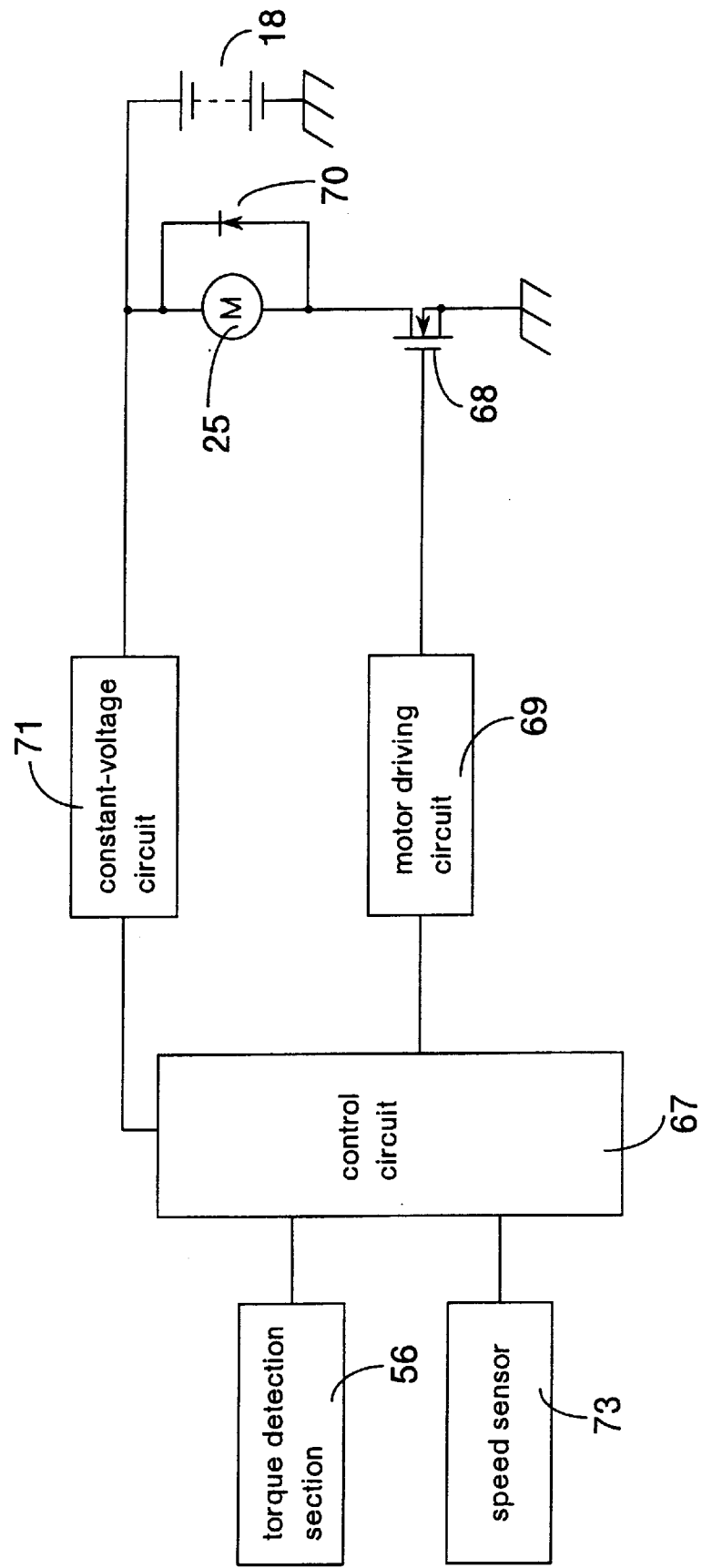
FIG. 8 is a block diagram illustrating a control circuit in accordance with Embodiment 2 of the present invention.

A control circuit is explained with reference to FIG. 8. In the control circuit, parts similar to those in Embodiment 1 are denoted by the same reference numerals and the description thereof is omitted.

The reference numeral 73 is a speed sensor to determine the number of rotations of the wheel. The speed sensor 73 is composed of a magnet mounted on the rotary casing 22 and a reed switch mounted on the fixed casing 21. By inputting the determined rotation number to the control circuit 67, the traveled distance can be calculated. The speed sensor 73 is also referred to as traveled distance calculation means since the traveled distance can be obtained through the control circuit 67.

Figure 9:
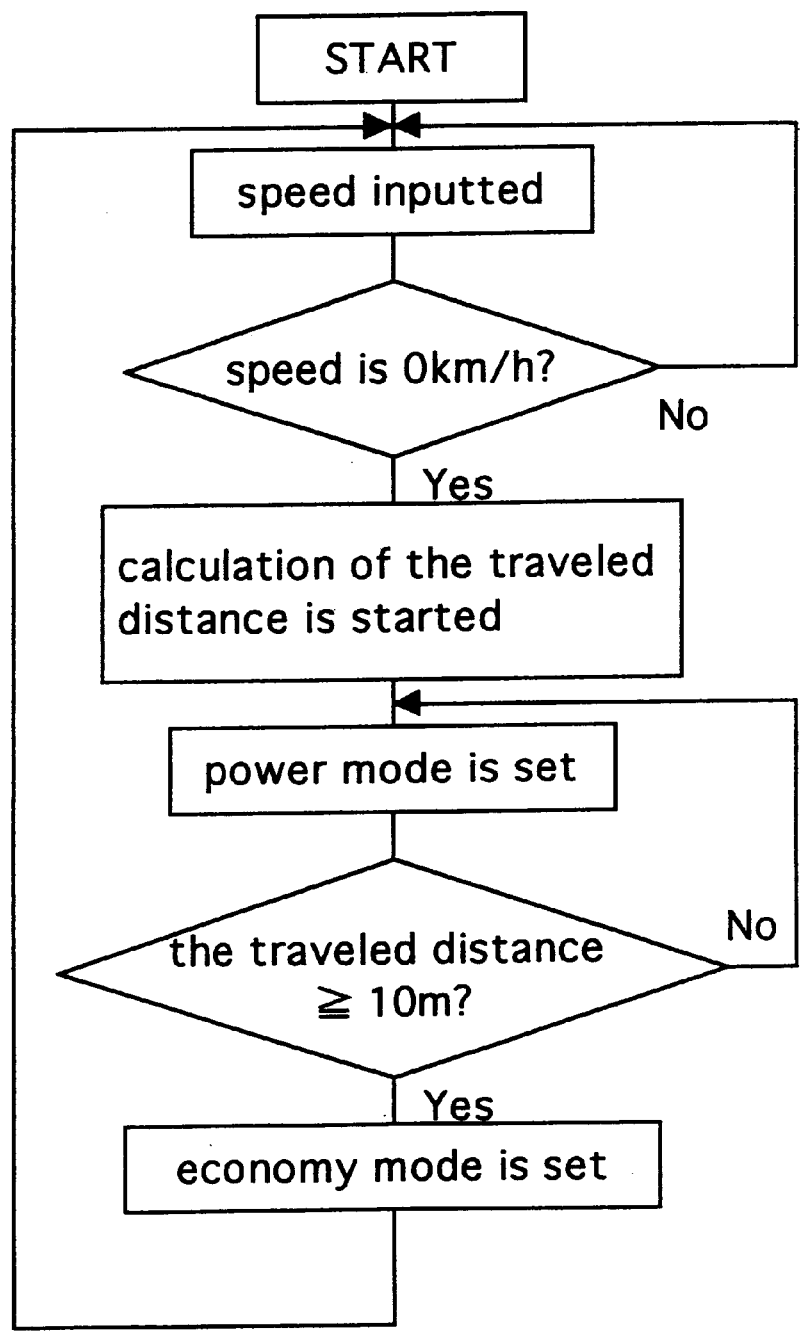
FIG. 9 is a flowchart explaining an operation of the control circuit in accordance with Embodiment 2 of the present invention.

The operation of the control circuit in this embodiment is now explained with reference to FIG. 9.

At the beginning of the operation, the control circuit receives speed data inputted by the speed sensor 73 to insure the bicycle is in a stopping state. Then the calculation of the traveled distance is started. Until 10 m has been traveled, the assist mode is set to the power mode shown in FIG. 7 whereby the bicycle runs in the power mode providing a high assist ratio. After 10 m has been traveled, the assist mode is switched to the economy mode shown in FIG. 6 and the bicycle runs in the economy mode until the bicycle stops. Referring to a flowchart shown in FIG. 9, the speed is constantly measured and inputted. The bicycle is controlled to run in the power mode from where its speed becomes 0 until it covers 10 m and then run in the economy mode until the rear wheel 11 stops.

Thus, the bicycle runs in the power mode from starting to covering 10 m, i.e., while it needs large torque for starting, and runs in the economy mode after it covers 10 m. Therefore, the assist power by the motor can be sufficiently obtained when large assist power is required for starting. Then, after traveling a certain distance, the assist mode is switched to the economy mode for saving the consumption of the battery. Thus, operability is improved.

Embodiment 3 is now described.

The overall construction of the bicycle of this embodiment is the same as Embodiments 1 and 2, and the explanation thereof is omitted.

Figure 10:
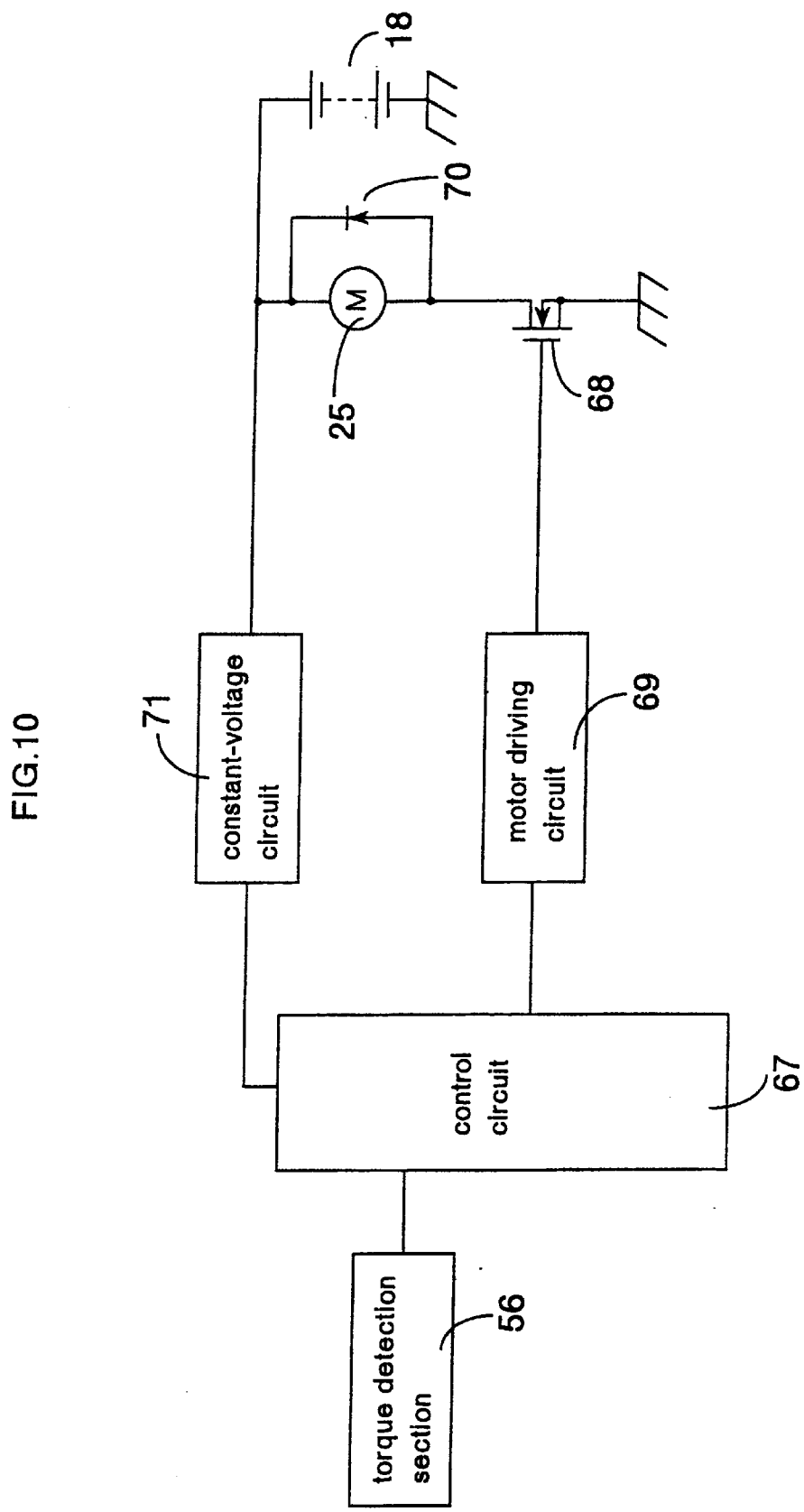
FIG. 10 is a block diagram illustrating a control circuit in accordance with Embodiment 3 of the present invention.

A control circuit of this embodiment is now described with reference to FIG. 10. Also in the control circuit, parts similar to those in Embodiment 1 and 2 are denoted by the same reference numerals and the description thereof is omitted. Here, the torque detection section 56 is referred to as human power torque calculating means.

The operation of the control circuit in this embodiment is now explained with reference to FIG. 11.

When the operation is started, the human power torque is constantly inputted from the torque detection section 56 for a predetermined time period, and then the average value is calculated from the inputted values by the control circuit 67. This average value is compared with 150 kg·cm. If the average value is 150 kg·cm or more, the power mode shown in FIG. 7 which is stored in the control circuit 67 is selected for traveling. The average value of 150 kg·cm or more may mean that large assistance is required, for example, when the bicycle is being started or traveling up a slope. Accordingly the power mode providing a higher assist ratio is selected. If the average value is 150 kg·cm or less, the economy mode shown in FIG. 6, which is stored in the control circuit 67, is selected for traveling. The average value of 150 kg·cm or less may mean that much assistance is not required, for example, when the bicycle is traveling on level ground. Accordingly the economy mode providing a lower assist ratio is selected. As described above, since the assist mode is switched to the economy mode or to the power mode according to the average human power torque, the assist ratio is automatically changed to provide suitable assistance power. Thus, the user can obtain sufficient assist power when he/she needs large assistance power, and the consumption of the battery can be saved when he/she needs only small assist power.

Figure 11:
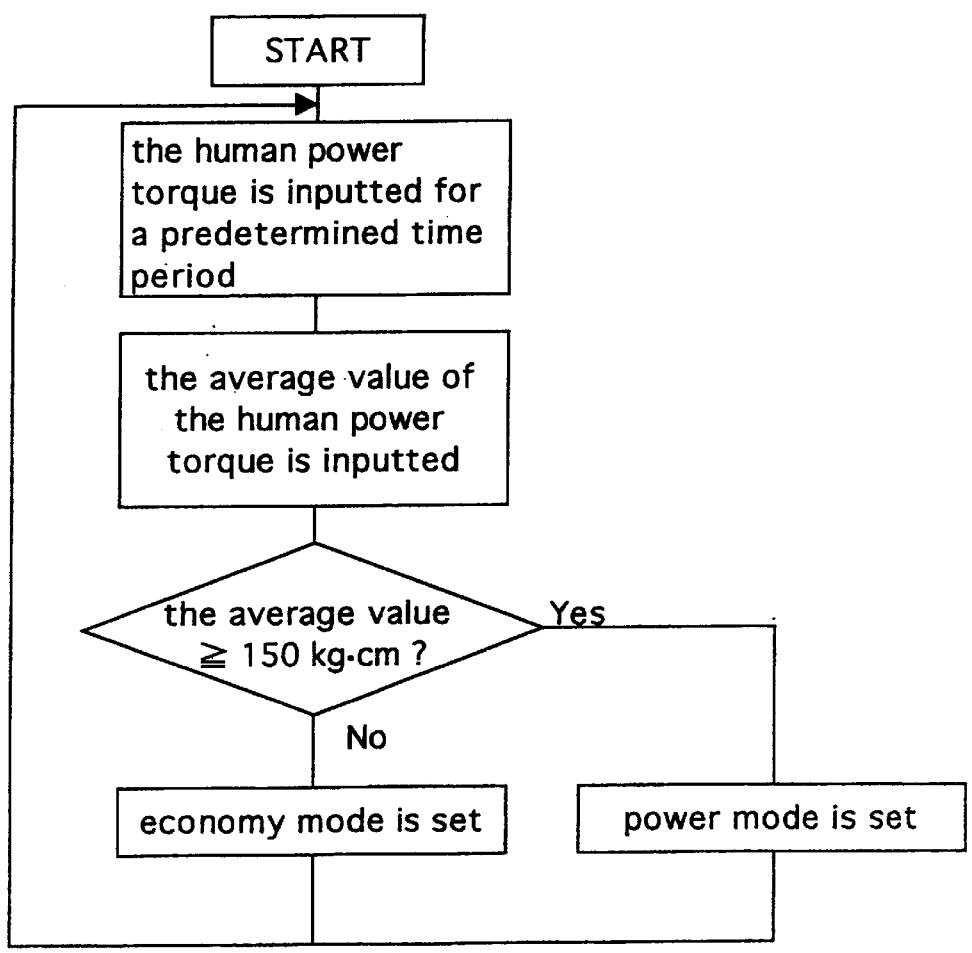
FIG. 11 is a flowchart explaining an operation of the control circuit in accordance with Embodiment 3 of the present invention.

In Embodiment 3, used is the average of human power torque given to the pedals 5 within a predetermined time period as shown in a flowchart of FIG. 11. However, alternatively, the average of human power torque given to the pedals 5 at every sampling may be used as shown in FIGS. 12 and 13.

Figure 12:
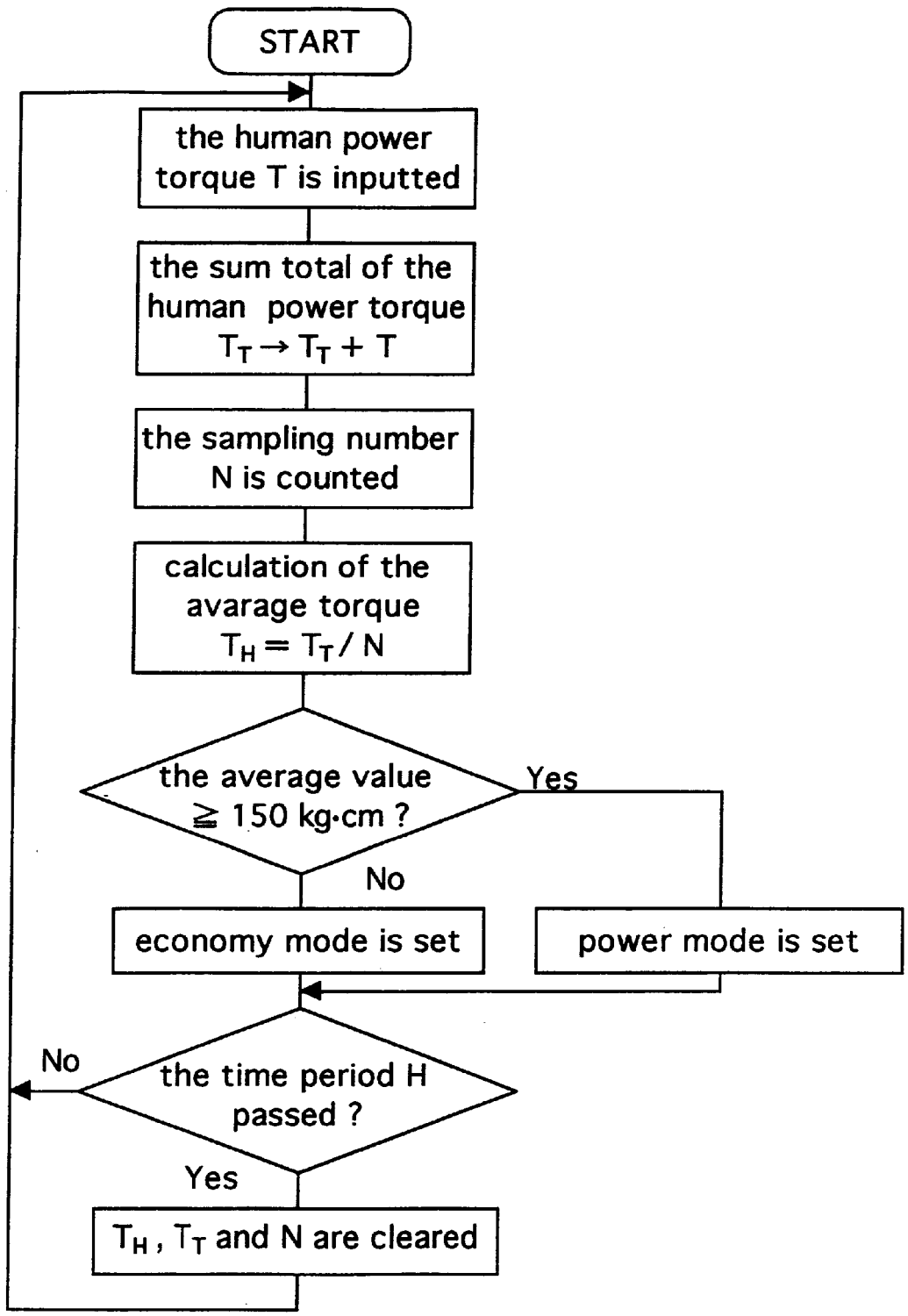
FIG. 12 is a flowchart explaining an operation of a modified control circuit.
Figure 13:
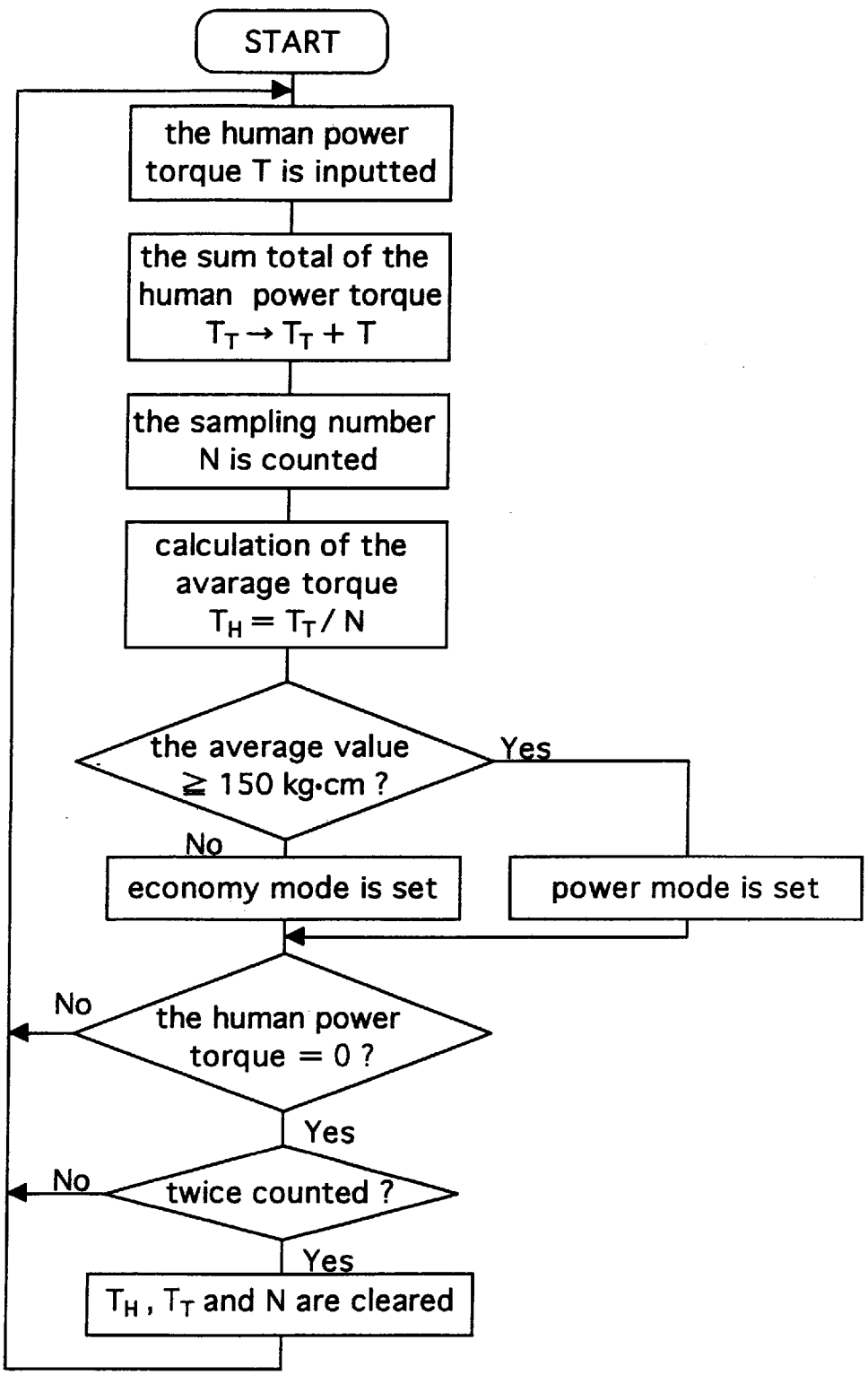
FIG. 13 is a flowchart explaining an operation of another modified control circuit.
Figure 14:
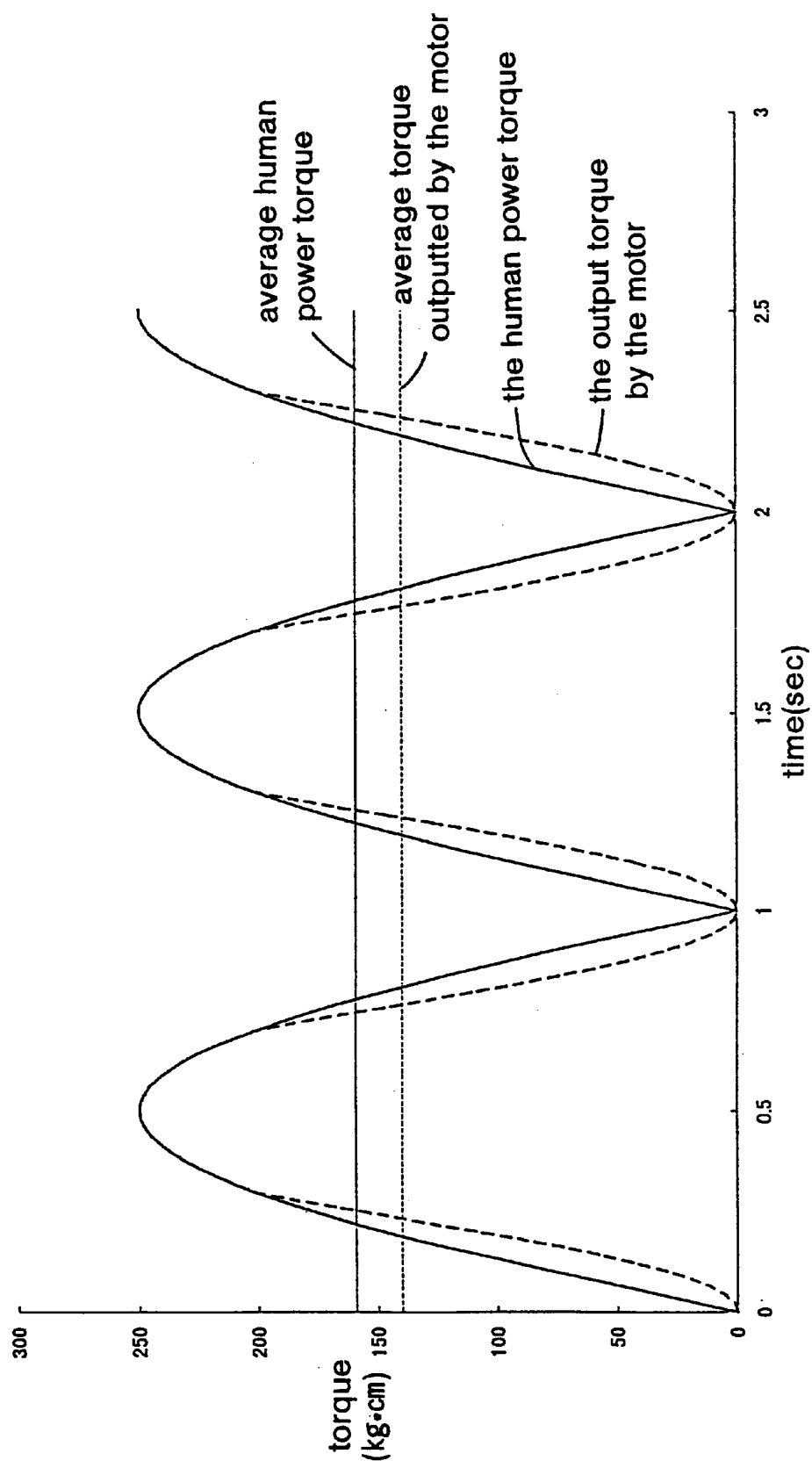
FIG. 14 shows outputted waveforms of a human power torque and an electric driving power torque.

Referring to FIG. 12, $T_T$ represents the sum total of the human power torque and $T_H$ represents the average of human power torque after N samplings. H represents a predetermined time period H for sampling. After the time period H has passed, the sampling number (counter) is cleared. As the time period H, a suitable time period is selected for use, for example, two seconds, three seconds or the like. Alternatively, the sampling counter may be cleared after 50 samplings, instead of the time period H. Referring to FIG. 13, when the human power torque is determined as being 0 twice, the pedals 5 are judged to have turn once and the counter is cleared. Here, the human power torque is sampled in a cycle of a predetermined time, for example, 10 ms.

In the above Embodiments 1 to 3, the explanation has been given with the two kinds of assist modes shown in FIGS. 6 and 7. However, the assist modes are not limited thereto, but three or more kinds of assist modes may be established which provides various assist ratios from small one to large one.

Figure 15:
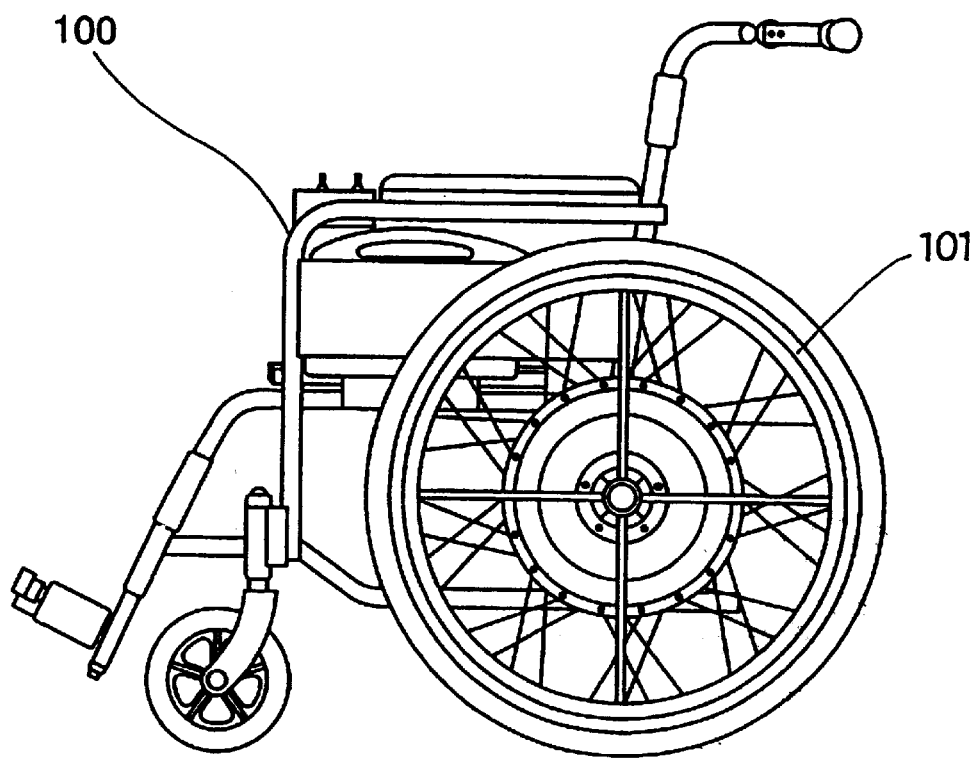
FIG. 15 is a side elevational view of an electrically assisted wheelchair embodying a driving power applying section of applying human driving power to a vehicle driving wheel.

FIG. 15 depicts a wheelchair embodying electrically assisted wheelchair human driving power applied with a hand rim 101 connected to conventional drive wheels fitted to the wheelchair body 100.

What is claimed is:

1. An electrically assisted vehicle comprising:
   a vehicle body having a driving wheel driven by human driving power and electric driving power;
   a driving power applying section for applying the human driving power to drive the driving wheel;

a torque detection section to detect the human driving power applied to the driving power applying section;

a motor to auxiliarily drive the driving wheel by the electric driving power;

a battery to supply power for the motor; and a control section to control the motor according to a result detected by the torque detection section, wherein the control section has a plurality of switchable assist modes relating to an assist ratio of the electric driving power to the human driving power.

2. The electrically assisted vehicle according to claim 1, wherein the torque detection section detects the presence of the human power torque.

3. The electrically assisted vehicle according to claim 1, wherein the torque detection section determines the magnitude of the human driving power.

4. The electrically assisted vehicle according to claim 1, wherein the torque detection section converts an amount of compression of a helical spring in a direction of rotation of the driving wheel into an amount of movement in a direction of a axle of the driving wheel and detects the amount of movement as an electric signal by an induction coil.

5. The electrically assisted vehicle according to claim 1, wherein the plural assist modes comprises an economy mode in which the assist ratio increases as a human power torque increases until the human power torque reaches a predetermined value and the assist ratio is kept constant when the human power torque exceeds the predetermined value; and a power mode in which the assist ratio is kept constant regardless of the value of the human power torque.

6. The electrically assisted vehicle according to claim 1, wherein the assist modes are switched from that providing a small assist ratio to that proving a high assist ratio according to the result detected by the torque detection section.

7. The electrically assisted vehicle according to claim 1, wherein the assist modes are switched from that providing a large assist ratio to that providing a small assist ratio according to the result detected by the torque detection section.

8. The electrically assisted vehicle according to claim 1 further comprising a switch for selecting one of the plural assist modes, wherein a user operates the switch to selected a desired assist mode.

9. The electrically assisted vehicle according to claim 1 further comprising a traveled-distance calculating section for calculating a distance traveled continuously from a stop, wherein the control section instructs the switching of one of the plural assist modes to another when the traveled distance calculated by the traveled-distance calculating section reaches a predetermined value.

10. The electrically assisted vehicle according to claim 1 further comprising a human power torque calculating section for calculating an average magnitude of the human driving power, wherein the control section instructs the switching of one of the plural assist modes to another according to the average magnitude of the human driving power calculated by the human power torque calculating section.

11. The electrically assisted vehicle according to claim 10, wherein the average magnitude of the human driving power calculated by the human power torque calculating section is an average magnitude of the human driving power applied to the driving power applying section within a predetermined time period.

12. The electrically assisted vehicle according to claim 10, wherein the average magnitude of the human driving power calculated by the human power torque calculating section is an average magnitude of the human driving power applied to the driving power applying section a predetermined number of times.

13. The electrically assisted vehicle according to claim 1, wherein the vehicle body is a bicycle body and the driving power applying section is a pedal mounted on the bicycle body.

14. The electrically assisted vehicle according to claim 1, wherein the vehicle body is a wheelchair body and the driving power applying section is a hand rim mounted on the wheelchair body.

* * * * *